US008806227B2

United States Patent
Grinchuk et al.

(10) Patent No.: US 8,806,227 B2
(45) Date of Patent: Aug. 12, 2014

(54) DATA SHREDDING RAID MODE

(75) Inventors: Mikhail I. Grinchuk, San Jose, CA (US); Anatoli A. Bolotov, Cupertino, CA (US); Ranko Scepanovic, Saratoga, CA (US); Robert D. Waldron, Fort Collins, CO (US)

(73) Assignee: LSI Corporation, San Jose, CA (US)

( * ) Notice: Subject to any disclaimer, the term of this patent is extended or adjusted under 35 U.S.C. 154(b) by 1678 days.

(21) Appl. No.: 11/620,794

(22) Filed: Jan. 8, 2007

(65) Prior Publication Data

US 2008/0046764 A1 Feb. 21, 2008

Related U.S. Application Data (60) Provisional application No. 60/821,430, filed on Aug. 4, 2006.

(51) Int. Cl.
*G06F 12/14* (2006.01)
*G06F 21/62* (2013.01)

(52) U.S. Cl.
CPC .................... *G06F 21/6218* (2013.01)
USPC .......................................... 713/194

(58) Field of Classification Search
USPC ............... 726/13, 26–30, 2; 707/10, 205; 711/114, 100; 705/71; 380/264, 268; 713/194
See application file for complete search history.

(56) References Cited

U.S. PATENT DOCUMENTS

| | | | | |
|---|---|---|---|---|
| 5,103,479 A | * | 4/1992 | Takaragi et al. | 380/28 |
| 5,524,204 A | * | 6/1996 | Verdoorn, Jr. | 714/6 |
| 7,434,069 B2 | * | 10/2008 | Nessler | 713/193 |
| 2002/0049883 A1 | * | 4/2002 | Schneider et al. | 711/100 |
| 2002/0069318 A1 | * | 6/2002 | Chow et al. | 711/104 |
| 2002/0114453 A1 | * | 8/2002 | Bartholet et al. | 380/44 |
| 2003/0065656 A1 | * | 4/2003 | de la Torre et al. | 707/3 |
| 2003/0070083 A1 | * | 4/2003 | Nessler | 713/193 |
| 2003/0115282 A1 | * | 6/2003 | Rose | 709/214 |
| 2003/0149869 A1 | * | 8/2003 | Gleichauf | 713/153 |
| 2003/0182566 A1 | * | 9/2003 | Kohara et al. | 713/193 |
| 2004/0205352 A1 | * | 10/2004 | Ohyama | 713/194 |
| 2005/0216813 A1 | * | 9/2005 | Cutts et al. | 714/752 |
| 2006/0045270 A1 | * | 3/2006 | Cohen | 380/268 |
| 2006/0143505 A1 | * | 6/2006 | Olarig et al. | 714/6 |
| 2007/0101158 A1 | * | 5/2007 | Elliott | 713/193 |
| 2007/0113032 A1 | * | 5/2007 | Kameyama et al. | 711/162 |
| 2008/0244277 A1 | * | 10/2008 | Orsini et al. | 713/193 |

OTHER PUBLICATIONS

Patterson et al., "A Case for Redundant Arrays of Inexpensive Disks (RAID)," Proceedings of the 1988 ACM SIGMOD international conference on Management of data, 1988, pp. 109-116.
Draft Proposal for Tweakable Narrow-block Encryption, Draft 1.00:00, http://siswg.org/docs/LRW-AES-10-19-2004.pdf.

* cited by examiner

*Primary Examiner* — Brandon Hoffman
(74) *Attorney, Agent, or Firm* — Luedeka Neely Group, P.C.; Rick Barnes (57) ABSTRACT

A method of storing sensitive data by generating randomization values, transforming the sensitive data and the randomization values into a result, and storing separate portions of the result on at least two storage devices, such that the sensitive data cannot be disclosed if any one of the storage devices is compromised.

22 Claims, 2 Drawing Sheets

DATA SHREDDING RAID MODE

This invention claims priority on U.S. provisional application 60/821,430 filed Aug. 4, 2006.

FIELD

This invention relates to the field of data storage. More particularly, this invention relates to a data privacy operational mode for an array of hard drives.

BACKGROUND

Most users of personal computers are at least somewhat familiar with the hard drive on which their data is stored. In a typical configuration, the computer includes a single hard drive, on which data is magnetically stored. When a user needs more hard drive space on which to store their data, they typically either buy a larger capacity hard drive and swap out their smaller hard drive, or they add a second hard drive to their computer. Similarly, if a user needs faster access to their stored data, they will typically purchase a faster hard drive, such as one with a higher rotational spindle speed or a faster interface.

However, there are many applications that demand more from a data storage system than can be provided by the simplistic solutions offered above. For example, some applications benefit from data retrieval and storage speeds that far exceed the ability to achieve such with a faster rotational speed or a more efficient interface on a single drive. Further, issues such as retaining data in the event of a hard drive crash are also not easily resolved with separately functioning hard drives.

One solution to these issues has been the creation of a standard for redundant arrays of independent/inexpensive disks (RAID). RAIDs use two or more hard drives as a logically combined unit to achieve one or more desired purposes. For example, by writing and then reading data in stripes on two different drives, faster data throughput can be achieved than would be possible with a single drive. In addition, by mirroring data on more than one drive in the RAID, data can be recovered in the event that less than all of the drives fail.

However, RAID does not offer a good solution for data privacy, in the event that something less than all of the drives are stolen or otherwise accessible to an unauthorized party.

What is needed, therefore, is a system that overcomes problems such as those described above, at least in part.

SUMMARY

The above and other needs are met by a method of storing sensitive data by generating randomization values, transforming the sensitive data and the randomization values into a result having a length that is greater than the data length, and storing separate portions of the result on at least two storage devices.

The transformation is chosen such that: (a) it is reversible, such that when all drives are accessible to an authorized user, the sensitive data can be easily and quickly reconstructed by reversing the transformation process, and (b) it provides automatic self-shredding of the data as it is written, such that if any one of the storage devices is compromised, such as by being stolen or otherwise accessible to an unauthorized user, then the storage device does not contain a sufficient amount of information to reconstruct even the smallest piece of the sensitive data, without accessing the other devices. In some embodiments the data are transformed by bitwise XOR operation with the randomization values and optionally with other pieces of data.

In some embodiments the data, the randomization values, and the results are divided into numbered segments, and the transforming step is performed separately and independently for each group of segments with an identical number (address).

The storage devices may have an equal data storage capacity. In some embodiments the data storage devices are hard disk drives. The data segment can be one of: one bit of the sensitive data, one byte of the sensitive data, or one block of the sensitive data.

The transforming step may or may not depend on a storage address for the results. In some embodiments, the transforming step depends (as a periodical sequence) at least in part on a storage address for the results, such that there exist values T that are greater than one, such that for all storage addresses A, the transforming step for the $A^{th}$ numbered segments is identical to that for the $A+T^{th}$ and $A-T^{th}$ numbered segments. In some embodiments, the transforming step depends cyclically on the storage address, such that a numbered segment A on a storage device D has properties similar to a numbered segment A+1 on a storage device D+d (here d is a constant, 0<d<n, n is the total number of storage devices, and the last "+" denotes addition modulo n).

In some embodiments, at least one of the at least two storage devices only stores the randomization values. In other embodiments, for each storage address A there exists at least one storage device D(A) such that the $A^{th}$ numbered segment of D(A) only stores the randomization values.

In some embodiments the randomization values are true random numbers, while in other embodiments the randomization values are pseudo random numbers.

Access to the data stored in a system according to the invention may include the following operations: initialization (formatting), reading, writing (with automatic shredding), optionally also re-initialization (generating randomization values anew without loss of sensitive data). In some embodiments extra operations may be supported, such as reading and writing when at least one storage device is in a failure state or disconnected, and operations to provide system integrity after connecting new storage devices to replace failed or removed storage devices.

According to yet another aspect of the present invention, there is described a hard drive controller card with ports adapted to send data and control signals to the storage devices and to send and receive data and control signals from a computer, and local functional and memory units to support the functionality required for all the recited data access operations. Algorithms of its behavior may include the following:

(1) An initialization module that associates relative positions on hard drives with each other, generates randomization values and writes the randomization values (after appropriate transformation, if necessary) to the relative position on the hard drives.

(2) A data writing (shredding) module that receives sensitive data, and for each data segment of the sensitive data, selects one of the relative positions, reads appropriate values from the selected relative position of some of the first selected hard drives, transforms the data segment with an XOR function with these values to produce transformed data segments for one or more second selected hard drives, and writes the transformed data segments to the selected relative position on a second selected hard drives.

(3) A data reading module that reads the transformed data segments from the selected relative position on the selected hard drives and reconstructs the requested data segment with an XOR function.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

We propose a new class of RAID (Redundant Array of Independent/Inexpensive Disks) modes: disk arrays with "self-shredding." Regular RAIDs are designed to achieve better (compared to single drives) data integrity, fault tolerance, throughput and capacity. We propose one extra dimension: physical security. That is, disk arrays designed such that if up to S disks of the array are stolen (or just put in the trash and then picked up), then the "enemy" will get nothing else but white noise data, with 0 bits of information (even if he/she has unlimited computational resources and can check all possible keys). In other words, we eliminate (under certain conditions) the necessity to use any kind of shredder for physically destroying the data on the disks that are removed from the array. The "self-shredding," however, does not substitute standard cryptographic data protection during regular functioning (i.e. solutions defined in the Disk encryption standard P1619 and similar ones, where the disks contain data in a transformed form), but it also has its own preferences over cryptography-based methods:

1. Scrambling (for example, XORing data with predefined secret sequences) is not robust enough against the intensive data analysis of the whole disk, and
2. Strong cryptographic solutions that involve massive calculations may require special infrastructure, operating with secret keys, etc., also, they can introduce an extra (and unavoidable) delay for the random data reading (strong cryptography requires long decryption procedure).

The self-shredding, on the other hand, is easy in implementation (either in hardware or in software) and can be made absolutely unbreakable against the attack specified above.

Definition: The disk array is S-safe, if up to S disks can be "stolen by enemies" or "picked up from the trash" with zero risk of data disclosure.

Self-shredding can be combined with fault tolerance, producing systems that support up to F simultaneous faults and are S-safe. Schemes with (F=0, S=1), (F=1, S=1), (F=1, S=2) and (F=1, S=3) are explicitly proposed in the present invention and described below in details, larger values are also possible. General structure may resemble the well-known standard RAID levels 4 or 5 and has moderate redundancy (one extra disk for F=0, S=1, two extra disks for F=S=1, about $\log_2 N$ for F=1, S=2 or S=3, where N is the equivalent number of user's data disks). Self-shredding solutions are relatively simple in implementation: just a random generator and a checksum technique, preferably without complicated cryptographic calculations. But in the end result, the content of individual disks is protected by code with extremely massive key material, such that the data is secure against attacks where the attacker has up to S of the RAID disks, and has unlimited computational resources.

The new RAID modes are methodologically similar to standard ones (those with checksums) and can be implemented in similar way. Various combinations of speed/robustness/security requirements can be achieved by the new modes alone or in combination (as nested RAID levels) with standard modes.

Operational Modes

Mode F0:S1

Figure 1:
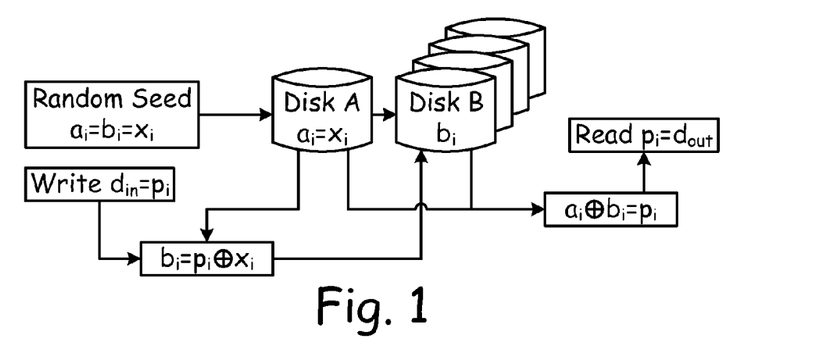
FIG. 1 depicts initializing, writing, and reading in the simplest (2-disk) variant of mode F0:S1.

This mode is the simplest embodiment of the method, as depicted in FIG. 1. Minimally, it uses two disks (A and B) with equal capacity (n bits per disk) and a Random Number Generator (RNG), and behaviorally models one n-bit disk. During the initialization phase of the system, we generate n random bits $x_i$ (i=0, ..., n−1), and write them identically to each of the two disks ($a_i=b_i=x_i$). Then, when later writing data bit $p_i$ to address i on drive B, we actually write $b_i=p_i \oplus x_i$ to the disk B, where value $x_i=a_i$ comes from the disk A, and "$\oplus$" denotes XOR (summation modulo 2). When reading from address i, we read both disks (receiving values $a_i$ and $b_i$ respectively), and compute $a_i \oplus b_i = x_i \oplus (p_i \oplus x_i) = p_i$. That is, we get the desired value.

Note. Instead of single bits, here and everywhere below we may refer to multi-bit blocks, with bit-wise XOR operations. Further, it is appreciated that some other transformation besides XOR could be used to compute the transformed value that is written to disk B, and to reconstruct the data value that is read from the disks.

Now suppose that somebody knows all $a_i$ (and nothing more), such as by coming into possession of hard drive A. Then he/she actually knows nothing, because $a_i=x_i$, which are just random numbers.

If he/she knows all $b_i$ (and nothing more), such as by coming into possession of hard drive B, then he/she also knows nothing, because $b_i=p_i \oplus x_i$, and random numbers $x_i$ XORed with anything not depending on them are random numbers again.

There are at least two possible options regarding the choice of the random generator used to produce the values: (1) a True Random Number Generator (TRNG), which can provide the maximum protection, and (2) a Pseudo-Random Number Generator (PseudoRNG), where the seed can be considered as one of secondary security keys, which might be cheaper in production, and can give a possibility of emergency unlocking of the data.

Figure 2:
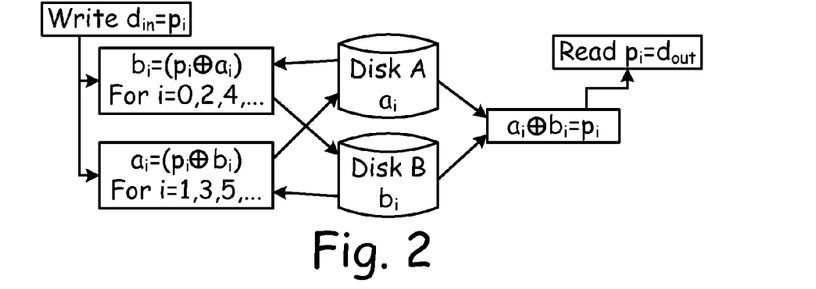
FIG. 2 depicts writing and reading in the simplest (2-disk) variant of mode F0:S1 with load balancing.

In a practical implementation of this mode, it may be reasonable to more uniformly distribute load between the two disks (now B is used more actively than A). To do this, we may, for example, use $a_i=x_i$ and $b_i=p_i \oplus x_i$ when the ith bit belongs to block 0, 2, 4, ..., and $a_i=p_i \oplus x_i$ and $b_i=x_i$ when ith bit belongs to block 1, 3, 5, ..., as depicted in FIG. 2.

It is also possible to extend this mode for multiple (3, 4, 5, ...) disks: for each address i, one of disks holds a random value, and all other disks contain the user's data XORed with the random value. It is appreciated that, when it is stated that one of the disks holds a random value, that it is not necessary that all of the random data is contained on just one of the hard drives, although that is what is depicted in the figures, for simplicity. Rather, as mentioned elsewhere, the random values for different positions on the hard drives can be disposed on different hard drives, so as to level the load on the hard drives. But for convenience's sake, this will be depicted and generally referred to as the random values residing on one of the disks herein.

Formal Description of F0:S1 Algorithms

In this section we define a multi-disk variant with load balancing, i.e. the system where blocks with randomizing values are equally distributed among all available physical disks. This can be achieved in multiple ways, we describe the variant (similar to the RAID 5 versus RAID 4) where the position of randomizing blocks depends on their serial numbers: the $i^{th}$ randomizing block r(i) is placed as the $i^{th}$ block on the physical disk number i mod n, where n is the total number of physical disks, and the data-containing blocks $d_0(j)$, $d_1(j)$, . . . (that contain the user's data XORed with r(i)) cyclically follow it, as given in the table below:

| | Without load balancing | | | | | | With load balancing | | | |
|---|---|---|---|---|---|---|---|---|---|---|
| | | Physical disks | | | | | | Physical disks | | |
| Blocks | 0 | 1 | 2 | 3 | 4 | Blocks | 0 | 1 | 2 | 3 | 4 |
| 0 | r(0) | $d_0(0)$ | $d_1(0)$ | $d_2(0)$ | $d_3(0)$ | 0 | r(0) | $d_0(0)$ | $d_1(0)$ | $d_2(0)$ | $d_3(0)$ |
| 1 | r(1) | $d_0(1)$ | $d_1(1)$ | $d_2(1)$ | $d_3(1)$ | 1 | $d_3(1)$ | r(1) | $d_0(1)$ | $d_1(1)$ | $d_2(1)$ |
| 2 | r(2) | $d_0(2)$ | $d_1(2)$ | $d_2(2)$ | $d_3(2)$ | 2 | $d_2(2)$ | $d_3(2)$ | r(2) | $d_0(2)$ | $d_1(2)$ |
| 3 | r(3) | $d_0(3)$ | $d_1(3)$ | $d_2(3)$ | $d_3(3)$ | 3 | $d_1(3)$ | $d_2(3)$ | $d_3(3)$ | r(3) | $d_0(3)$ |
| 4 | r(4) | $d_0(4)$ | $d_1(4)$ | $d_2(4)$ | $d_3(4)$ | 4 | $d_0(4)$ | $d_1(4)$ | $d_2(4)$ | $d_3(4)$ | r(4) |
| 5 | r(5) | $d_0(5)$ | $d_1(5)$ | $d_2(5)$ | $d_3(5)$ | 5 | r(5) | $d_0(5)$ | $d_1(5)$ | $d_2(5)$ | $d_3(5)$ |
| 6 | r(6) | $d_0(6)$ | $d_1(6)$ | $d_2(6)$ | $d_3(6)$ | 6 | $d_3(6)$ | r(6) | $d_0(6)$ | $d_1(6)$ | $d_2(6)$ |
| 7 | r(7) | $d_0(7)$ | $d_1(7)$ | $d_2(7)$ | $d_3(7)$ | 7 | $d_2(7)$ | $d_3(7)$ | r(7) | $d_0(7)$ | $d_1(7)$ |

Notation:
n=number of physical disks (numbered 0, 1, . . . , n−1),
n−1=number of logical disks (numbered 0, 1, . . . , n−2),
S=physical/logical disk size (in blocks),
$ld_i(j)$=jth data block for the ith logical disk ($0 \le i \le n-2$, $0 \le j < S$),
$pd_i(j)$=jth data block for the ith physical disk ($0 \le i \le n-1$, $0 \le j < S$).

Elementary access functions include: initialization, reading, and writing. (Below we are using different indentation to show the depth of nesting in algorithms.)

Initialization:

```
for each j=0, 1, ..., S−1
    generate random block b
    for each i=0, 1, ..., n − 1
        pd_i(j) ← b
```

Reading Logical Block $ld_i(j)$:

```
r ← j mod n
d ← (r+i+1) mod n
ld_i(j) ← XOR(pd_d(j), pd_r(j))  (this step includes two physical disk readings)
```

Writing Logical Block $ld_i(j)$:

```
r ← j mod n
d ← (r+i+1) mod n
b (a saved random data block) ← pd_r(j) (a physical disk reading)
pd_d(j) ← XOR(ld_i(j), b) (a physical disk writing)
```

Mode F1:S1

Figure 3:
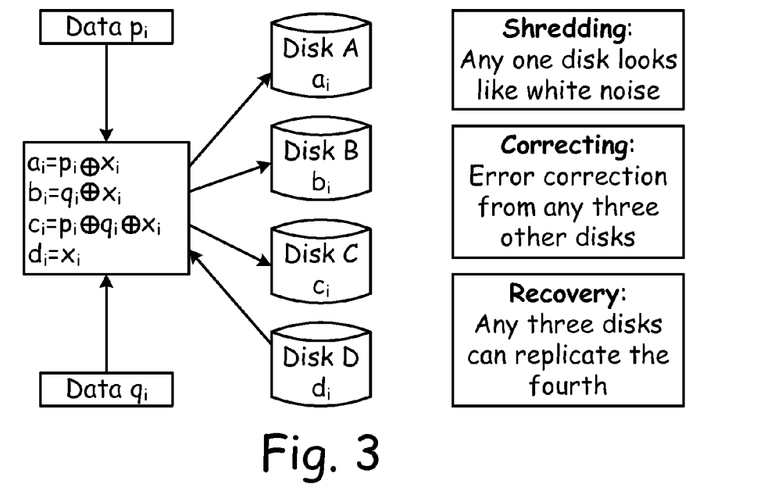
FIG. 3 depicts the simplest (4-disk) variant of mode F1:S1.

F1:S1 is the simplest case combining the property of "self-shredding" with error correction. Let us consider the model with four identical n-bit disks, A,B,C,D, to hold up to 2n data bits, say, $p_i$ and $q_i$, where i=0, . . . , n−1. Let initially $a_i=b_i=c_i=d_i=x_i$ where $x_i$ (i=0, . . . , n−1) are random bits generated by RNG. If all four disks are error-free, we will maintain the following data distribution on disks, as depicted in FIG. 3:

$a_i=p_i \oplus x_i$, $b_i=q_i \oplus x_i$, $c_i=p_i \oplus q_i \oplus x_i$, $d_i=x_i$.

Each individual disk of this set contains white noise (a random value $x_i$ or its XORing with some data), i.e. the system is 1-safe. But (and this is new in comparison to the F0:S1 mode), it is also error-correcting: any three of these four values ($a_i$, $b_i$, $c_i$, $d_i$) gives the possibility of finding both $p_i$ and $q_i$: $p_i$ can be computed either as $a_i \oplus d_i$ or as $b_i \oplus c_i$, $q_i$ can be computed either as $b_i \oplus d_i$, or as $a_i \oplus c_i$. Thus, we can correct the failure of any single disk of our set.

Possible work protocols for F1:S1 mode may include: (1) main mode, when all disks are working properly, including: (a) reading $p_i$: read two disks and compute $p_i=a_i \oplus d_i$ or $p_i=b_i \oplus c_i$ (note that under certain conditions it allows us to simultaneously read, say, $p_i$ and $p_j$, i.e. the reading is twice as fast than for an individual disk), (b) reading $q_i$: also read two disks and compute $q_i=b_i \oplus d_i$ or $q_i=a_i \oplus c_i$, (c) writing $p_i$: read $b_i$ and $d_i$ and write $a_i=p_i \oplus d_i$ and $c_i=p_i \oplus b_i$, (d) writing $q_i$: read $a_i$ and $d_i$ and write $b_i=q_i \oplus d_i$ and $c_i=q_i \oplus a_i$, (2) error-correcting mode, when one of the disks has experienced a failure (and is considered to be absent): in this case, we still can read both $p_i$ and $q_i$ in a standard way (one of two possible expansions is available), but writing is more complicated. We have to read all three remaining disks, compute (by XORing) $p_i$, $q_i$ and $x_i$, then compute (also by XORing) new values for all these disks and perform actual writing, (3) refreshing procedure, used after replacement of a failed disk with a new one: go through all locations, read the disks, compute $p_i$ and $q_i$, generate new $x_i$, calculate values $a_i$, $b_i$, $c_i$, $d_i$ and write them to disks.

To prevent non-uniform loading of the disks, this mode may also be organized with address-dependent "shifts" in the mapping scheme (similar to the organization of the standard RAID level 5).

This mode can also be implemented for k=6, 8, 10, 12 etc. disks, the storing capacity is effectively equivalent to k−2 independent disks. Roughly speaking, we have to use one extra disk for error correcting (checksums or parity), and one more for the data security purposes. Namely, one disk holds just random values, then k−2 disks contain actual data XORed with the random content of the 1st disks, and the last disk contains the modulo 2 sum (XOR) of all other disks. The restriction "k is an even number" is preferable to make this control sum also protected by XORing with our random numbers (otherwise the random values will eliminate each other and the control sum might directly reflect the user's data).

Formal Description of F1:S1 Algorithms

In this section we define a multi-disk variant with load balancing organized in a similar way to F0:S1 above. Namely, the ith randomizing block is placed as the ith block on the physical disk number i mod n, where n is the total number of physical disks, the next disk (number (i+1) mod n) contains the "checksum," and the remaining disks contain protected data.

Notation:
- n=number of physical disks (numbered 0, 1, . . . , n−1, n is an even number greater than 2),
- n−2=number of logical disks (numbered 0, 1, . . . , n−3),
- S=physical/logical disk size (in blocks),
- $ld_i(j)$=jth data block for the ith logical disk ($0 \le i \le n-3$, $0 \le j < S$),
- $pd_i(j)$=jth data block for the ith physical disk ($0 \le i \le n-1$, $0 \le j < S$).

Elementary access functions include: initialization, regular reading, regular writing, complementary reading (efficient for n=4 only), emergency reading (used when one of disks is detected as malfunctioning or removed), emergency writing, re-initialization (used when the bad physical disk is just replaced with a new one).

Initialization (Destroying all Previously Stored Data, if any):

```
r ← j mod n
d ← (r+i+2) mod n
ld_i(j) ← XOR(pd_d(j), pd_r(j)) (this step includes two physical disk readings)
```

Regular Reading Logical Block $ld_i(j)$:

```
for each j=0, 1, ..., S − 1
    generate random block b
    for each i=0, 1, ..., n − 1
        pd_i(j) ← b
```

Regular Writing Logical Block $ld_i(j)$:

```
r ← j mod n
s ← (r+1) mod n
d ← (r+i+2) mod n
b_rnd (a saved random data block) ← pd_r(j) (a physical disk reading)
b_sum (old value of checksum) ← pd_s(j) (a physical disk reading)
b_old (old value of updated data block) ← pd_d(j) (a physical disk reading)
pd_d(j) ← XOR(ld_i(j), b_rnd) (a physical disk writing)
pd_s(j) ← XOR(ld_i(j), b_old, b_sum) (a physical disk writing)
```

Complementary Reading Logical Block $ld_i(j)$:

```
s ← (j+1) mod n
for each k=0, 1, ..., n−3, not including k=i
    d(k) ← (s+k+1) mod n
ld_i(j) ← XOR(pd_s(j), pd_d(0)(j), ..., pd_d(n−1)(j)) (without pd_d(i),
    this step includes n−2
    physical disk readings)
```

Emergency Reading Logical Block $ld_i(j)$ when Physical Disk Number k is Bad or Removed:

```
r ← j mod n
d ← (r+i+2) mod n
if k≠r and k≠d
    perform regular reading
else
    perform complementary reading
```

Emergency Writing Logical Block $ld_i(j)$ when Physical Disk Number k is Bad or Removed:

```
r ← j mod n
s ← (r+1) mod n
d ← (r+i+2) mod n
if k≠r and k≠s and k≠d
    perform regular writing
else
    for each m=0, 1, ..., n−1 not including m=k
        b_m ← pd_m(j) (parallel reading jth block from each available
            physical disk)
    b_k ← XOR_(m=0,1,...,n−1, m≠k) b_m (computing jth block for
        the unavailable disk)
    b_s ← XOR(b_s, b_d, ld_i(j)) (computing new checksum)
    b_d ← XOR(b_r, ld_i(j)) (computing new data)
    if k≠s
        pd_s(j) ← b_s (writing new checksum)
    if k≠d
        pd_d(j) ← b_d (writing new data)
```

Re-Initialization when Physical Disk Number k is Just Replaced (Preserving Data):

```
for each j=0, 1, ..., S − 1
    r ← j mod n
    generate random block brnd
    for each m=0, 1, ..., n−1, not including m=k
        b_m ← pd_m(j) (parallel reading jth block from each "old" physical
            disk)
    b_k ← XOR_(m=0,1,...,n−1, m≠k) b_m (computing jth block for the new disk)
    for each m=0, 1, ..., n − 1
        pd_m(j) ← XOR(b_m, b_rnd) (parallel writing jth block to each
            physical disk)
```

Mode F1:S2

This mode supports error correcting in case of failures of any single disk, as well as prevents data disclosure if the "enemy" gets any two disks from the array. The array preferably consists of $2^m-1$ disks of the same size and has a storing capacity equal to $2^m-m-1$ individual disks (i.e. we use about $\log_2 N$ "auxiliary" disks for N "data" disks).

The structure of mode F1:S2 is more complicated than the modes described above. Let the disks be numbered by sequential m-digit binary numbers from 1=[000 . . . 001] to $2^m-1$=[111 . . . 111]. "Randomization" disks with serial numbers 1=[000 . . . 001], 2=[000 . . . 010], 4=[000 . . . 0100], . . . , $2^{m-1}$=[100 . . . 000] contain independent random bits. Let the ith bit on the disk number $2^j$ be $x^j_i$. Other disks, excepting the very last one $2^m-1$=[111 . . . 111], are "data" disks and contain actual user's data XORed with one or more "randomization" values, depending on the binary expansion of the serial number, the last disk $2^m-1$=[111 . . . 111] contains the modulo 2 sum (XOR) of all other disks. General data mapping is the following (here we use m=4 for illustrative purposes):

| | | | | | |
|---|---|---|---|---|---|
| [0001]= | | $x^0_i$ | | | (random) |
| [0010]= | | | $x^1_i$ | | (random) |
| [0011]=$data_i[0]$ | | $\oplus\, x^0_i$ | $\oplus\, x^1_i$ | | (data) |
| [0100]= | | | | $x^2_i$ | (random) |
| [0101]=$data_i[1]$ | | $\oplus\, x^0_i$ | | $\oplus\, x^2_i$ | (data) |
| [0110]=$data_i[2]$ | | | $\oplus\, x^1_i$ | $\oplus\, x^2_i$ | (data) |
| [0111]=$data_i[3]$ | | $\oplus\, x^0_i$ | $\oplus\, x^1_i$ | $\oplus\, x^2_i$ | (data) |
| [1000]= | | | | | $x^3_i$ (random) |
| [1001]=$data_i[4]$ | | $\oplus\, x^0_i$ | | | $\oplus\, x^3_i$ (data) |
| [1010]=$data_i[5]$ | | | $\oplus\, x^1_i$ | | $\oplus\, x^3_i$ (data) |
| [1011]=$data_i[6]$ | | $\oplus\, x^0_i$ | $\oplus\, x^1_i$ | | $\oplus\, x^3_i$ (data) |
| [1100]=$data_i[7]$ | | | | $\oplus\, x^2_i$ | $\oplus\, x^3_i$ (data) |
| [1101]=$data_i[8]$ | | $\oplus\, x^0_i$ | | $\oplus\, x^2_i$ | $\oplus\, x^3_i$ (data) |
| [1110]=$data_i[9]$ | | | $\oplus\, x^1_i$ | $\oplus\, x^2_i$ | $\oplus\, x^3_i$ (data) |
| [1111]=$data_i[0]$ | $\oplus\, \ldots \oplus\, data_i[9] \oplus$ | $x^0_i$ | $\oplus\, x^1_i$ | $\oplus\, x^2_i$ | $\oplus\, x^3_i$ (checksum) |

The system is able to recover the failure or lack of any single disk: its content equals the XOR of all other disks.

Each pair of individual disks contains white noise, because each disk is protected by XORing with one or more random values, and all these "masks" are preferably different, i.e. they cannot compensate each other. That is, the system is 2-disk safe.

Mode F1:S2 can also be implemented with uniform loading of the member disks (in the same way that has been described for above for the other modes).

F1:S2 Algorithms

In this section we define multi-disk variant with load balancing organized in the similar way as in the two above-described modes.

Notation:

m=an integer parameter, n=$2^m$−1=number of physical disks, disks are numbered 1, 2, ..., n, n−m−1=number of logical disks, disks are numbered 0, 1, 2, ..., n−m−2, map(x)=function that sequentially maps nonnegative integers 0, 1, 2, ... to positive integers not having the form $2^i$, i.e.: 0→3, 1 ... 3→5 ... 7, 4 ... 10→9 ... 15, 11 ... 25→17 ... 31, etc., invmap(y)=the inverse function (defined only if the binary expansion of y has two or more non-zero digits): invmap (map(x))≡x, S=physical/logical disk size (in blocks), $ld_i(j)$=jth data block for the ith logical disk ($0 \le i \le n-m-1$, $0 \le j < S$), $pd_i(j)$=jth data block for the ith physical disk ($1 \le i \le n$, $0 \le j < S$).

Elementary access functions include: initialization, regular reading, regular writing, emergency reading (used when one of disks is detected as malfunctioning or removed), emergency writing, re-initialization (used when the bad physical disk is just replaced with a new one).

Initialization (Destroying all Previously Stored Data, if any):

--- for each j=0, 1, ..., S − 1
    generate random blocks $b^{rnd}_0, \ldots, b^{rnd}_{m-1}$
    for each i=1, 2, ..., n
        represent i in binary system, i.e. as the sum of different
        powers of 2:
        i=$2^{k1}+2^{k2}+\ldots+2^{kmax}$, where $0 \le k1 < k2 < \ldots < kmax \le m-1$
        $b_i \leftarrow$ XOR($b^{rnd}_{k1}, b^{rnd}_{k2}, \ldots, b^{rnd}_{kmax}$)
    for each i=1, 2, ..., n
        q ← ((j+i) mod (n−1))+1
        $pd_q(j) \leftarrow b_i$ (writing jth block to each physical disk)

---

Regular Reading Logical Block $ld_i(j)$:

--- i' ← map(i)
represent i' in binary system, i.e. as the sum of different powers of 2:
    i'=$2^{k1}+2^{k2}+\ldots+2^{kmax}$, where $0 \le k1 < k2 < \ldots < kmax \le m-1$
q ← ((j+i') mod (n−1))+1
for each kt=k1, k2, ..., kmax
    q(t) ← ((j+$2^t$) mod (n−1))+1
$ld_i(j) \leftarrow$ XOR($pd_q(j), pd_{q(1)}(j), pd_{q(2)}(j), \ldots, pd_{q(max)}(j)$) (this step includes minimum three and maximum m+1 physical disk readings)

---

Regular Writing Logical Block $ld_i(j)$:

--- s ← ((j+n−1) mod (n−1))+1
d ← ((j+map(i)) mod (n−1))+1
using the method above, read old value of $ld_i(j)$ and save it as $b_{data}$ (it requires from three to m+1 disk readings, including $pd_d(j)$, let the latter be also saved as $b_{old}$)
$b_{sum}$ (old value of checksum) ← $pd_s(j)$ (a physical disk reading)
$pd_d(j) \leftarrow$ XOR($b_{old}(j), ld_i(j), b_{data}$) (a physical disk writing)
$pd_s(j) \leftarrow$ XOR($b_{sum}(j), ld_i(j), b_{data}$) (a physical disk writing)

---

Emergency Reading Logical Block $ld_i(j)$ when Physical Disk Number k is Bad or Removed:

--- if regular reading of $ld_i(j)$ will not use $pd_k(j)$
    do regular reading
else
    for each t=1, 2, ..., n, not including t=k
        $b_t \leftarrow pd_t(j)$ (reading the jth block of each disk)
    $b_k \leftarrow$ XOR$_{(t=1,2,\ldots,n,\, t \ne k)} b_t$
    do regular reading with $b_t$ instead of $pd_t(j)$, t=1, 2, ..., n
    (this step does not
        require actual disk reading, just computing)

---

Emergency Writing Logical Block $ld_i(j)$ when Physical Disk Number k is Bad or Removed:

--- if regular writing of $ld_i(j)$ will not use reading $pd_k(j)$
    do regular writing (skipping attempts to write into $pd_k(j)$, if any)
else
    for each t=1, 2, ..., n, not including t=k
        $b_t \leftarrow pd_t(j)$ (reading the jth block of each disk)
    $b_k \leftarrow$ XOR$_{(t=1,2,\ldots,n,\, t \ne k)} b_t$
    do regular writing with $b_t$ instead of old values of $pd_t(j)$, t=1, 2, ..., n, skip attempts to write into $pd_k(j)$, if any (this step does not require actual disk readings, just computing and at most two writings)

---

Re-Initialization when Physical Disk Number k is Just Replaced (Preserving Data):

--- for each j=0, 1, ..., S − 1
    for each t=1, 2, ..., n, not including t=k
        $b_t \leftarrow pd_t(j)$ (parallel reading jth block from each "old" physical disk)
    $b_k \leftarrow$ XOR$_{(t=1,2,\ldots,n,\, t \ne k)} b_t$ (computing jth block for the new disk)
    do regular reading of $ld_0(j), ld_1(j), \ldots, ld_{n-m-2}(j)$ with $b_t$ instead of $pd_t(j)$, t=1, 2, ..., n (this step does not require actual disk reading, just computing)
    generate random blocks $b^{rnd}_0, b^{rnd}_1, \ldots, b^{rnd}_{m-1}$
    for each i=1, 2, ..., n
        represent i in binary system, i.e. as the sum of different powers of 2: i=$2^{k1}+2^{k2}+\ldots+2^{kmax}$, where $0 \le k1 < k2 < \ldots < kmax \le m-1$
        $b'_i \leftarrow$ XOR($b^{rnd}_{k1}, b^{rnd}_{k2}, \ldots, b^{rnd}_{kmax}$)
        if i has form $2^t$
            $b_i \leftarrow b'_i$
        else if i < n
            $b_i \leftarrow$ XOR($b'_i, ld_{invmap(i)}(j)$)

```
        else (that is if i=n)
            b_n ← XOR(b'_n, XOR_(t=0,...,n-m-2) ld_t(j))
    for each i=1, 2, ..., n
        q ← ((j+i) mod (n−1))+1
        pd_q(j) ← b_i (writing jth block to each physical disk)
```

Mode F1:S3

Adding just one disk to the mode F1:S2 makes it 3-safe. The new disk (let it be marked as [000 . . . 000]) contains one more random sequence, this sequence is XORed to every other disk, namely to those disks that have originally been XORed with 2, 4, 6 etc. random terms. See the sample data mapping scheme for 16-disk system (equivalent to ten individual disks for data, five more disks for the randomization, and finally one more disk for the checksum), here $u_i$ denotes the ith bit of the new random sequence:

| | | | | | |
|---|---|---|---|---|---|
| [0000]= | | | | $u_i$ | (random) |
| [0001]= | $x^0_i$ | | | | (random) |
| [0010]= | | $x^1_i$ | | | (random) |
| [0011]=data$_i$[0] ⊕ | $x^0_i$ ⊕ | $x^1_i$ ⊕ | | $u_i$ | (data) |
| [0100]= | | | $x^2_i$ | | (random) |
| [0101]=data$_i$[1] ⊕ | $x^0_i$ ⊕ | | $x^2_i$ ⊕ | $u_i$ | (data) |
| [0110]=data$_i$[2] ⊕ | | $x^1_i$ ⊕ | $x^2_i$ ⊕ | $u_i$ | (data) |
| [0111]=data$_i$[3] ⊕ | $x^0_i$ ⊕ | $x^1_i$ ⊕ | $x^2_i$ | | (data) |
| [1000]= | | | | $x^3_i$ | (random) |
| [1001]=data$_i$[4] ⊕ | $x^0_i$ ⊕ | | | $x^3_i$ ⊕ $u_i$ | (data) |
| [1010]=data$_i$[5] ⊕ | | $x^1_i$ ⊕ | | $x^3_i$ ⊕ $u_i$ | (data) |
| [1011]=data$_i$[6] ⊕ | $x^0_i$ ⊕ | $x^1_i$ ⊕ | | $x^3_i$ | (data) |
| [1100]=data$_i$[7] ⊕ | | | $x^2_i$ ⊕ | $x^3_i$ ⊕ $u_i$ | (data) |
| [1101]=data$_i$[8] ⊕ | $x^0_i$ ⊕ | | $x^2_i$ ⊕ | $x^3_i$ | (data) |
| [1110]=data$_i$[9] ⊕ | | $x^1_i$ ⊕ | $x^2_i$ ⊕ | $x^3_i$ | (data) |
| [1111]=data$_i$[0] ⊕ ... ⊕ data$_i$[9] ⊕ | $x^0_i$ ⊕ | $x^1_i$ ⊕ | $x^2_i$ ⊕ | $x^3_i$ ⊕ $u_i$ | (checksum) |

This system is still able to correct for the failure or loss of any single disk (its content can be restored by XORing all the other $k-1=2^m-1$ disks). Data on any two disks are protected, because all disks are randomized by different random expressions. But, additionally, any three disks are also protected: each disk has an odd number of random terms, and XORing all three disks cannot eliminate them all.

F1:S3 Algorithms

In this section we define a multi-disk variant with load balancing, that is organized in the same way as the F1:S2 mode, with appropriate changes.

Notation:

m=an integer parameter, n=$2^m$=number of physical disks, now disks are numbered 0, 1, . . . , n−1 (the "new" disk (as compared to F1:S2) has the number 0), n−m−2=number of logical disks, disks are numbered 0, 1, 2, . . . , n−m−3, map(x), invmap(y), S and $ld_i(j)$ have the same meaning as in F1:S2, $pd_i(j)$=jth data block for the ith physical disk (0≤i≤n−1, 0≤j<S).

Elementary access functions are the same as for F1:S2, namely: initialization, regular reading, regular writing, emergency reading (used when one of disks is detected as malfunctioning or removed), emergency writing, re-initialization (used when the bad physical disk is just replaced with a new one).

Initialization (destroying all previously stored data, if any):

```
for each j=0, 1, ..., S − 1
    generate random blocks b^rnd_0, ..., b^rnd_{m−1} and b^rnd_+
    for each i=0, 1, ..., n − 1
        represent i in binary system, i.e. as the sum of different
            powers of 2: i=$2^{k1}+2^{k2}+...+2^{kmax}$, where 0 ≤ k1 < k2 <
            ...< kmax ≤ m−1
        if the binary expansion of i has an odd number of non-zero
            terms,
            then
                b_i ← XOR(b^rnd_{k1}, b^rnd_{k2}, ..., b^rnd_{kmax})
            else
                b_i ← XOR(b^rnd_{k1}, b^rnd_{k2}, ..., b^rnd_{kmax}, b^rnd_+)
    for each i=0, 1, ..., n − 1
        q ← ((j+i) mod n)
        pd_q(j) ← b_i (writing jth block to each physical disk)
```

Regular Reading Logical Block $ld_i(j)$:

```
i' ← map(i)
represent i' in binary system, i.e. as the sum of different powers of 2:
    i'=$2^{k1}+2^{k2}+...+2^{kmax}$, where 0 ≤ k1 < k2 <...< kmax ≤ m − 1
q ← ((j+i') mod n)
for each k_r=k_1, k_2, ..., k_{max}
    q(t) ← ((j+$2^r$) mod n)
if the binary expansion of i' has an odd number of terms, then
    ld_i(j) ← XOR(pd_q(j), pd_{q(1)}(j), pd_{q(2)}(j), ..., pd_{q(max)}(j))
        (this step includes a minimum of four and a maximum
        of m+1 physical disk readings)
else
    q_+ ← (j mod n)
    ld_i(j) ← XOR(pd_q(j), pd_{q(1)}(j), pd_{q(2)}(j) ..., pd_{q(max)}(j), pd_{q+}(j))
        (from four to m+2 physical disk readings)
```

Regular Writing Logical Block $ld_i(j)$:

```
s ← ((j+n−1) mod n)
d ← ((j+map(i)) mod n)
using the method above, read old value of ld_i(j) and save it as b_data
    (it requires from four to m+2 disk readings, including pd_d(j),
    let the latter be also saved as b_old)
b_sum (old value of checksum) ← pd_s(j) (a physical disk reading)
pd_d(j) ← XOR(b_old(j), ld_i(j), b_data) (a physical disk writing)
pd_s(j) ← XOR(b_sum(j), ld_i(j), b_data) (a physical disk writing)
```

Re-Initialization when Physical Disk Number k is Just Replaced (Preserving Data):

```
for each j=0, 1, ..., S − 1
    for each t=0, 1, ..., n−1, not including t=k
        b_t ← pd_t(j) (parallel reading jth block from each "old" physical
            disk)
    b_k ← XOR_(t=0,1,...,n−1, t≠k) b_t (computing jth
    block for the new disk)
    do regular reading of ld_0(j), ld_1(j), ..., ld_{n−m−3}(j) with b_t instead
        of pd_t(j), t=0, 1, ..., n−1 (this step does not require actual
        disk reading, just computing)
    generate random blocks b^rnd_0, b^rnd_1, ..., b^rnd_{m−1}, b^rnd_+
    for each i=0, 1, ..., n − 1
        represent i in binary system, i.e. as the sum of different
            powers of 2: i=$2^{k1}+2^{k2}+...+2^{kmax}$, where 0 ≤ k1 < k2 <
            ...< kmax ≤ m−1
        if the binary expansion of i has an odd number of non-zero
            terms,
            then
                b'_i ← XOR(b^rnd_{k1}, b^rnd_{k2}, ..., b^rnd_{kmax})
            else
                b'_i ← XOR(b^rnd_{k1}, b^rnd_{k2}, ..., b^rnd_{kmax}, b^rnd_+)
        if i=0 or i has form $2^t$
            b_i ← b'_i
        else if i < n − 1
            b_i ← XOR(b'_i, ld_{invmap(i)}(j))
```

```
    else (that is if i=n-1)
        b_{n-1} ← XOR(b'_{n-1}, XOR_{(i=0,...,n-m-3)} ld_i(j))
    for each i=0, 1, ..., n - 1
        q ← ((j+i) mod n)
        pd_q(j) ← b_i (writing jth block to each physical disk)
```

Combining with Standard RAID Modes

The new RAID modes described herein can be combined with standard RAID modes, similar to how nested levels of RAID 0 and RAID 1 create RAID 0+1 or RAID 1+0. For example, we may use RAID 1 as the top level and one of our modes (say, F1:S1) as the bottom level. This combination will improve speed and reliability without deterioration in security.

Figure 4:
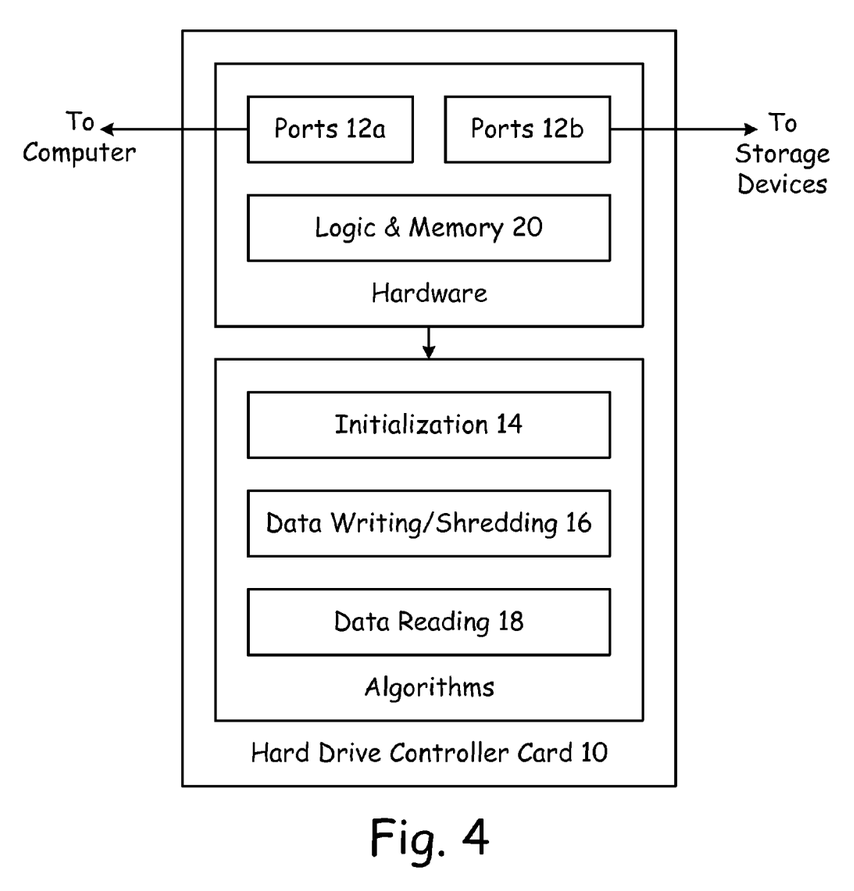
FIG. 4 depicts main hardware and software components of a controller card according to one embodiment of the present invention.

FIG. 4 depicts a hard drive controller card 10 according to one embodiment of the invention. The hard drive controller card 10 includes ports 12a and 12b for communicating with storage devices and the computer. Other hardware elements of logic and memory 20 implement algorithmic modules. An initialization module 14 that performs functions such as described above. For example, in one embodiment the initialization module 14 generates and writes the random numbers to the hard drives. A data shredding module 16 performs the data transformations as described above for the writing operations, and the data reading module 18 performs the actions as described above to reconstruct the data that is read from the hard drive system. The controller card 10 is, in one embodiment, placed in a typical personal computer, and used with any appropriate consumer hard drives.

In one embodiment, the functions of the controller card 10 as described above are provided by a read/write request interpreter. Status registers for each storage device indicate whether the storage device has data, is a broken, or is newly replaced, etc. A data processor, including a plurality of XOR gates, is used to process the data and otherwise control the functions of the controller card 10. Data buffers hold the data coming into and going out of the controller card 10 for both the data storage device and the data source. A random number generator is also preferably included in this embodiment.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of storing sensitive data, the method comprising:
   generating randomization values,
   dividing the sensitive data and the randomization values into numbered segments,
   transforming the sensitive data and the randomization values into a result separately and independently for each numbered segment, wherein the randomization values depend at least in part on a storage address for the result, where the storage address has a periodical sequence within a single storage device, such that there exist values T that are greater than one, such that for all storage addresses A, the transforming step for the $A^{th}$ numbered segments is identical to that for $A+T^{th}$ and non-negative $A-T^{th}$ numbered segments,
   storing separate portions of the result at the storage address on at least two storage devices,
   where the transforming step: (a) is reversible in that when all storage devices are accessible to an authorized user, the sensitive data can be reconstructed by reversing the transforming step, (b) provides automatic self-shredding of the sensitive data as it is stored on the storage devices in that when any one of the storage devices is accessible to an unauthorized user, then the storage device does not contain a sufficient amount of information to reconstruct any of the sensitive data, without accessing the other storage devices.

2. The method of claim 1 wherein the transforming step comprises a bitwise XOR operation of the numbered segments.

3. The method of claim 1 wherein at least one of the at least two storage devices only stores the randomization values.

4. The method of claim 1 wherein for each storage address, at least one storage device only stores the randomization values in the numbered segment with the storage address.

5. The method of claim 1 wherein the transforming step depends cyclically on the storage address, such that a numbered segment A on a storage device D has properties similar to a numbered segment A+I on a storage device D+d, where d is a constant, 0<d<n, n is a total number of storage devices, and the "+" in D+d denotes addition modulo n.

6. The method of claim 1, wherein the randomization values are true random numbers.

7. The method of claim 1, wherein the randomization values are pseudo random numbers.

8. The method of claim 1, wherein all data storage devices have an equal data storage capacity.

9. The method of claim 1, wherein all data storage devices are hard disk drives.

10. The method of claim 1, wherein the sensitive data is segmented into at least one of one bit of the sensitive data, one byte of the sensitive data, and one block of the sensitive data.

11. A method of storing sensitive data, the method comprising:
    associating identical relative logical positions on a first data storage device and a second data storage device,
    for each relative position on the first data storage device and the second data storage device,
        generating only one randomization value,
        writing the randomization value to the relative logical position on the first data storage device, and
        writing the randomization value to the relative logical position on the second data storage device, and
    for each data segment in the sensitive data,
        selecting one of the relative logical positions on the first data storage device and the second data storage device,
        reading the randomization value from the selected relative logical position,
        transforming the data segment with the randomization value as read, to produce a transformed data segment, and
        writing the transformed data segment to the selected relative logical position on a selected one of the first data storage device and the second data storage device.

12. The method of claim 11, wherein none of the transformed data segments are written onto the second data storage device.

13. The method of claim 11, wherein a first portion of the data segments are written onto the first data storage device, and a second portion of the data segments are written onto the second data storage device.

14. The method of claim 11, wherein the randomization values are true random numbers.

15. The method of claim 11, wherein the randomization values are pseudo random numbers.

16. The method of claim 11, wherein the data segment is transformed with an XOR operation with the randomization value.

17. The method of claim 11, wherein the first data storage device and the second data storage device have an equal data storage capacity.

18. The method of claim 11, wherein the first data storage device and the second data storage device are both hard disk drives.

19. The method of claim 11, wherein the data segment is one of: one bit of the sensitive data, one byte of the sensitive data, one block of the sensitive data.

20. A hard drive controller card, comprising:
ports to send data and control signals to at least a first hard drive and a second hard drive, and to communicate with a computer,
an initialization module to,
associate identical relative logical positions on the first hard drive and the second hard drive, and
for each relative logical position on the first hard drive and the second hard drive,
generate only one randomization value,
write the randomization value to the relative logical position on the first hard drive, and
write the randomization value to the relative logical position on the second hard drive,
a data shredding module to,
receive sensitive data, and
for each data segment in the sensitive data,
select one of the relative logical positions on the first hard drive and the second hard drive,
read the randomization value from the selected relative logical position,
transform the data segment with an XOR function with the randomization value as read, to produce a transformed data segment, and
write the transformed data segment to the selected relative logical position on a selected one of the first hard drive and the second hard drive, and
a data reading module to,
read the transformed data segment from the selected relative logical position on the selected one of the first hard drive and the second hard drive,
read the randomization value from the selected relative logical position of a nonselected one of the first hard drive and the second hard drive, and
reconstruct the data segment with an XOR function applied to the transformed data segment and the randomization value.

21. A hard drive controller card, comprising:
ports to send data and control signals to at least a first hard drive and a second hard drive, and to communicate with a computer,
hardware for implementing software algorithms, including;
an initialization algorithm that associates identical relative logical positions on the hard drives with each other, generates only one randomization value for each relative logical position and writes the randomization value to each relative logical position on the hard drives,
a data writing algorithm that receives sensitive data, and for each data segment of the sensitive data, selects one of the relative logical positions, reads the randomization value from the selected relative logical position of some of the hard drives, transforms the data segment with an XOR function with the randomization value to produce transformed data segments, and writes the transformed data segments to the selected relative logical position on at least a second selected hard drive, and
a data reading routine that reads the transformed data segments from the selected relative logical position on the selected hard drive and reconstructs the requested data segment with an XOR function to produce the sensitive data.

22. A hard drive controller card, comprising:
ports to send data and control signals to at least two hard drives and to communicate with a computer, and
hardware for implementing data access operations, including algorithmic modules, the algorithmic modules including,
an initialization module to,
associate identical relative logical positions on the hard drives with each other, and
for each relative logical position on the hard drives,
one of generate and receive from a separate random number generator only one randomization value, and
write the randomization value to the relative logical position on the hard drives, where the randomization value is selectively written in one of an unmodified form and a modified form,
a data writing module to,
receive sensitive data, and
for each data segment in the sensitive data,
select at least one of the hard drives,
read the randomization value from a selected relative logical position of the at least one selected hard drive,
transform with a first function the data segment with the randomization value as read, to produce at least one transformed data segment, and
write the at least one transformed data segment to the selected relative logical position on at least one hard drive, and
a data reading module to, for each data segment to be read,
select at least two of the hard drives, where at least one of the selected hard drives contains at least one transformed data segment in a selected relative position,
read the at least one transformed data segment from the selected relative logical position on the selected hard drives,
apply a second function based on the first function to the at least one transformed data segment to reconstruct the sensitive data, and
send the reconstructed sensitive data to the computer.

* * * * *